(12) United States Patent
Guo

(10) Patent No.: US 12,726,962 B2
(45) Date of Patent: Sep. 1, 2026

(54) METHOD FOR TRANSMITTING CAPABILITY OF USER EQUIPMENT

(71) Applicant: BEIJING XIAOMI MOBILE SOFTWARE CO., LTD., Beijing (CN)

(72) Inventor: Shengxiang Guo, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 294 days.

(21) Appl. No.: 18/563,657

(22) PCT Filed: May 26, 2021

(86) PCT No.: PCT/CN2021/096158
§ 371 (c)(1),
(2) Date: Nov. 22, 2023

(87) PCT Pub. No.: WO2022/246709
PCT Pub. Date: Dec. 1, 2022

(65) Prior Publication Data
US 2024/0251395 A1 Jul. 25, 2024

(51) Int. Cl.
*H04W 72/0453* (2023.01)
*H04W 8/24* (2009.01)

(52) U.S. Cl.
CPC ......... *H04W 72/0453* (2013.01); *H04W 8/24* (2013.01)

(58) Field of Classification Search
None
See application file for complete search history.

(56) References Cited

U.S. PATENT DOCUMENTS 10,278,183 B2 4/2019 Kim et al.
2013/0039232 A1* 2/2013 Kim ........................ H04L 43/06 370/280
2014/0328228 A1* 11/2014 Park ..................... H04B 7/2656 370/280

(Continued)

FOREIGN PATENT DOCUMENTS

CN 105553605 A 5/2016
WO WO-2010076376 A1 * 7/2010 .............. H04W 8/24
WO WO-2013104177 A1 * 7/2013 .............. H04W 8/22

OTHER PUBLICATIONS

PCT/CN2021/096158, International Search Report dated Dec. 29, 2021, 2 pages.

(Continued)

*Primary Examiner* — Jamaal Henson
(74) *Attorney, Agent, or Firm* — Cozen O'Connor

(57) ABSTRACT

A method for transmitting capability of a user equipment performed by a network device, including: sending first indication information to the user equipment in response to a working frequency band of the user equipment being a frequency division multiplexing frequency band, wherein the first indication information indicates the user equipment to report information of a duplex capability corresponding to the working frequency band. A method for transmitting capability of a user equipment is performed by the user equipment and includes: receiving first indication information from a network device, wherein the first indication information indicates the user equipment to report information of a duplex capability corresponding to a working frequency band.

14 Claims, 5 Drawing Sheets

(56) References Cited

U.S. PATENT DOCUMENTS

| | | | | |
|---|---|---|---|---|
| 2016/0218853 | A1 | 7/2016 | Takeda et al. | |
| 2016/0234825 | A1* | 8/2016 | Axmon | H04W 8/00 |
| 2017/0150355 | A1* | 5/2017 | Bergius | H04L 63/205 |
| 2022/0006603 | A1* | 1/2022 | Lei | H04W 80/02 |

OTHER PUBLICATIONS

European Patent Application No. 21942290.4 Search Report dated Feb. 17, 2025, 9 pages.

* cited by examiner

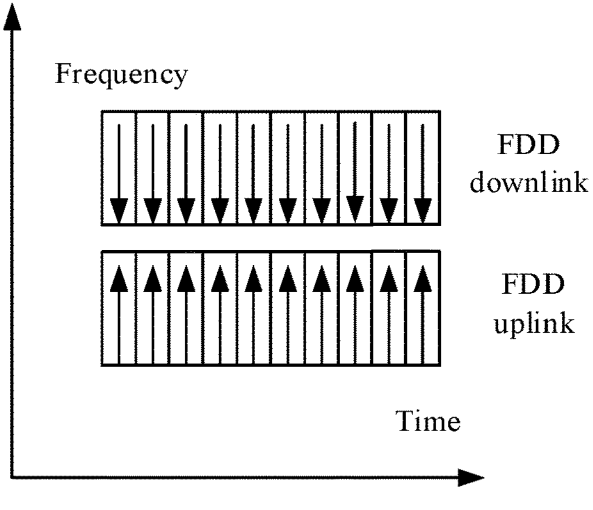
FIG. 1
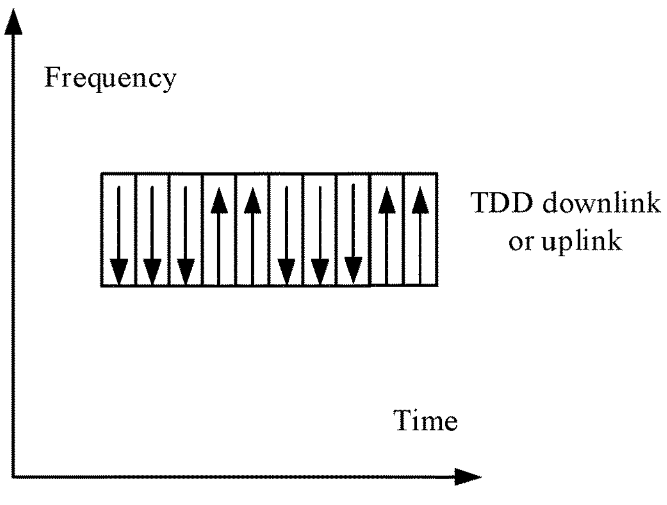
FIG. 2
Frequency
FDD downlink
FDD uplink
Time
FIG. 3

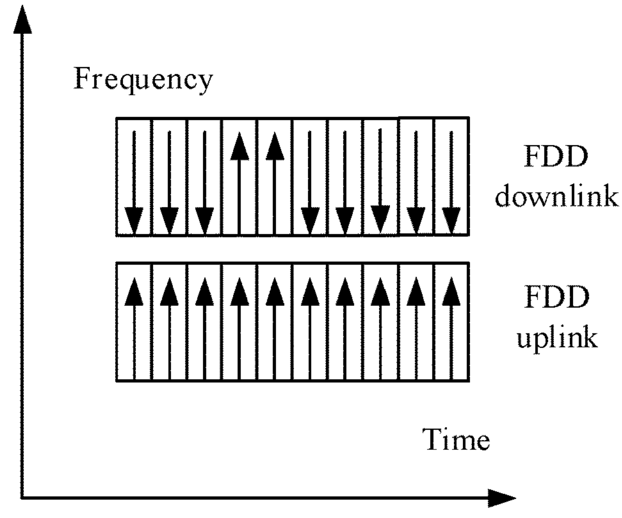

FIG. 4

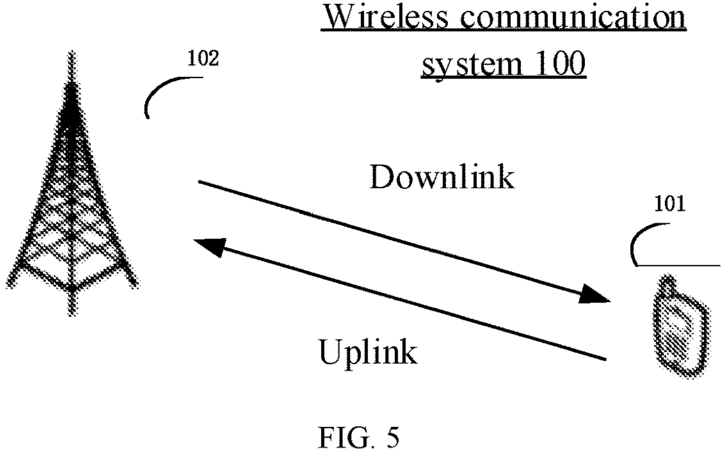

FIG. 5

Network device

User equipment

S101, sending first indication information to the user equipment in response to a working frequency band of the user equipment being a frequency division multiplexing frequency band, where the first indication information is configured to indicate the user equipment to report information of a duplex capability corresponding to the working frequency band

FIG. 6

METHOD FOR TRANSMITTING CAPABILITY OF USER EQUIPMENT

CROSS-REFERENCE TO RELATED APPLICATIONS

The present application is a National Stage of International Application No. PCT/CN2021/096158, filed on May 26, 2021, the contents of which are incorporated herein by reference for all purposes.

TECHNICAL FIELD

The present disclosure relates to the field of wireless communication technology, and particularly to a method and an apparatus for transmitting capability of a user equipment, and a readable storage medium.

BACKGROUND

The 4$^{th}$ generation mobile communication technology (4G) or 5$^{th}$ generation mobile communication technology (5G) usually adopt two kinds of duplex modes, one is a frequency division duplex (FDD) mode, as shown in FIG. 1, and the other is a time division duplex (TDD) mode, as shown in FIG. 2.

The FDD mode generally refers to symmetrical frequency bands, where an uplink frequency band is only provided with uplink services, and a downlink frequency band is only provided with downlink services, and thus the FDD mode is relatively suitable for symmetrical services in uplink and downlink. However, the uplink and downlink services of a user equipment are often asymmetrical. In order to overcome the above-mentioned shortcomings and to improve a frequency spectrum utilization efficiency, a flexible duplex mode may be used in the uplink frequency band as shown in FIG. 3. For the uplink frequency band in the FDD mode, uplink and downlink resources are dynamically allocated, which is similar to the TDD mode. Alternatively, the flexible duplex mode may be used in the downlink frequency band as shown in FIG. 4, that is, for the downlink frequency band in the FDD mode, uplink and downlink resources are dynamically allocated, which is similar to the TDD mode.

The user equipment may be a user equipment supporting the duplex mode or a user equipment not supporting the duplex mode. Away of effectively utilizing capability of the user equipment is a technical problem addressed in this disclosure.

SUMMARY

According to a first aspect of embodiments of the present disclosure, there is provided a method for transmitting capability of a user equipment, performed by a network device, including: sending first indication information to the user equipment in response to a working frequency band of the user equipment being a frequency division multiplexing frequency band, where the first indication information instructs the user equipment to report information of a duplex capability corresponding to the working frequency band.

According to a second aspect of embodiments of the present disclosure, there is provided a method for transmitting capability of a user equipment, performed by the user equipment, including: receiving first indication information from a network device, where the first indication information instructs the user equipment to report information of a duplex capability corresponding to a working frequency band.

According to a third aspect of embodiments of the present disclosure, there is provided a network device, including a processor and a memory, the memory is configured to store a computer program, and the processor is configured to execute the computer program to implement the method of the first aspect or any possible design of the first aspect.

According to a fourth aspect of embodiments of the present disclosure, there is provided a user equipment, including a processor and a memory, the memory is configured to store a computer program, and the processor is configured to execute the computer program to implement the method of the second aspect or any possible design of the second aspect.

According to a fifth aspect of embodiments of the present disclosure, there is provided a non-transitory computer readable storage medium having stored therein instructions (or a computer program, a program) that, when invoked and executed by a computer, cause the computer to perform the method of the first aspect or any possible design of the first aspect.

According to a ninth aspect of embodiments of the present disclosure, there is provided a non-transitory computer readable storage medium having stored therein instructions (or a computer program, a program) that, when invoked and executed by a computer, cause the computer to perform the method of the second aspect or any possible design of the second aspect.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure. In the accompanying drawings:

FIG. 1 is a schematic diagram illustrating a frequency division duplex according to an embodiment;

FIG. 2 is a schematic diagram illustrating a time division duplex according to an embodiment;

FIG. 3 is a schematic diagram illustrating a flexible duplex mode in an FDD mode according to an embodiment;

FIG. 4 is a schematic diagram illustrating another flexible duplex mode in an FDD mode according to an embodiment;

FIG. 5 is a schematic diagram illustrating an architecture of a wireless communication system according to an embodiment;

FIG. 6 is a flow chart illustrating a method for transmitting capability of a user equipment according to an embodiment;

DETAILED DESCRIPTION

Figure 7:
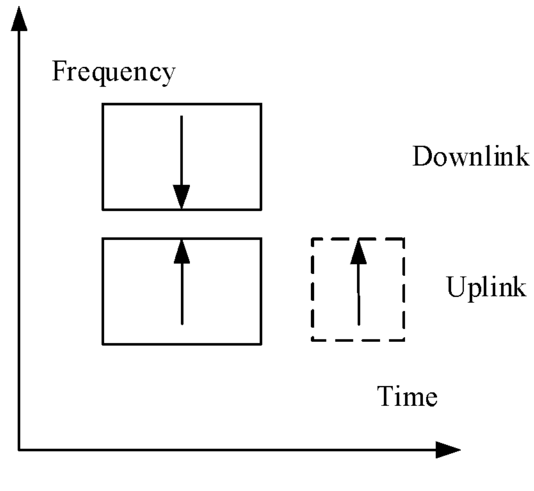
FIG. 7 is a schematic diagram illustrating a method for setting an uplink carrier according to an embodiment.

Embodiments of the present disclosure will now be further described with reference to the accompanying drawings and detailed description.

Reference will now be made in detail to embodiments, examples of which are illustrated in the accompanying drawings. The following description refers to the accompanying drawings in which the same reference numerals in different drawings represent the same or similar elements unless otherwise represented. The implementations set forth in the following description of the embodiments do not represent all implementations consistent with the present disclosure. Instead, they are merely examples of apparatuses and methods consistent with aspects related to the present disclosure as recited in the appended claims.

As shown in FIG. 5, a method for transmitting capability of a user equipment provided by embodiments of the present disclosure may be applied to a wireless communication system 100, which may include a user equipment 101 and a network device 102. The user equipment 101 is configured to support carrier aggregation, and the user equipment 101 may be connected to a plurality of carrier units of the network device 102, including one primary carrier unit and one or more secondary carrier units.

It should be understood that the wireless communication system 100 may be applicable to both low frequency and high frequency scenarios. Application scenarios of the wireless communication system 100 include, but are not limited to, a long term evolution (LTE) system, an LTE frequency division duplex (FDD) system, an LTE time division duplex (TDD) system, a worldwide interoperability for micro wave access (WiMAX) communication system, a cloud wireless access network (CRAN) system, a future 5th-Generation (5G) system, a new radio (NR) communication system or a future evolved public land mobile network (PLMN) system, etc.

The user equipment (UE) 101 shown above may be a terminal, an access terminal, a terminal unit, a terminal station, a mobile station (MS), a remote station, a remote terminal, a mobile terminal, a wireless communication device, a terminal agent or a user equipment, etc. The user equipment 101 may be equipped with a wireless transceiving function that may communicate (e.g. wirelessly) with one or more network devices of one or more communication systems and accept network services provided by the network devices, including, but not limited to, the illustrated network device 102.

The user equipment 101 may be a cellular phone, a cordless phone, a session initiation protocol (SIP) phone, a wireless local loop (WLL) station, a personal digital assistant (PDA) device, a handheld device with a wireless communication function, a computing device or other processing device connected to a wireless modem, an in-vehicle device, a wearable device, a user equipment in the future 5G network or a user equipment in the future evolved PLMN network, etc.

The network device 102 may be an access network device (or an access network point). The access network device refers to a device providing a network access function, such as a radio access network (RAN) base station. The network device 102 may specifically include a base station (BS), or a radio resource management device including a base station and for controlling the base station. The network device 102 may also include a relay station (a relay device), an access point, and the base station in the future 5G network, the base station in the future evolved PLMN network, or an NR base station, etc. The network device 102 may be a wearable device or an in-vehicle device. The network device 102 may also be a communication chip with a communication module.

For example, the network device 102 includes, but is not limited to: a next gnodeB (gNB) in the 5G, an evolved node B (eNB) in the LTE system, a radio network controller (RNC), a node B (NB) in a WCDMA system, a radio controller in the CRAN system, a base station controller (BSC), a base transceiver station (BTS) in a GSM or CDMA system, a home evolved nodeB (HNB), a baseband unit (BBU), a transmitting and receiving point (TRP), a transmission point (TP) or a mobile switching center, etc.

Embodiments of the present disclosure provide a method for transmitting capability of a user equipment. This method is performed by the network device. Referring to FIG. 6, FIG. 6 is a flow chart illustrating a method for transmitting capability of a user equipment according to an embodiment. As shown in FIG. 6, this method includes the following step.

In S101, first indication information is sent to the user equipment in response to a working frequency band of the user equipment being a frequency division multiplexing frequency band, where the first indication information is configured to indicate the user equipment to report information of a duplex capability corresponding to the working frequency band.

In embodiments of the present disclosure, the network device sends the first indication information to the user equipment to enable the user equipment to report the information of the duplex capability of the user equipment in the working frequency band. In this way, the network device may flexibly allocate uplink resources and downlink resources matched with the duplex capability of the user equipment based on whether the user equipment has the duplex capability and a specific type of the duplex capability the user equipment has, thus improving a utilization efficiency of the frequency spectrum.

Embodiments of the present disclosure provide the method for transmitting the capability of the user equipment. This method is performed by the network device. This method includes: receiving reported information from the user equipment, the reported information being configured to indicate the information of the duplex capability corresponding to the working frequency band for the user equipment.

In embodiments of the present disclosure, the network device sends the first indication information to the user equipment, and receives the reported information from the user equipment to learn the information of the duplex capability corresponding to the working frequency band for the user equipment. In this way, the network device may flexibly allocate the uplink resources and the downlink resources matched with the duplex capability of the user equipment based on whether the user equipment has the duplex capability and a specific type of the duplex capability the user equipment has, thus improving the utilization efficiency of the frequency spectrum.

Embodiments of the present disclosure provide the method for transmitting the capability of the user equipment. This method is performed by the network device. This method includes the following steps.

The first indication information is sent to the user equipment in response to the working frequency band of the user equipment being the frequency division multiplexing frequency band, where the first indication information is configured to indicate the user equipment to report the information of the duplex capability corresponding to the working frequency band.

The reported information is received from the user equipment, and the reported information is configured to indicate the information of the duplex capability corresponding to the working frequency band for the user equipment.

The reported information includes a first field, where the first field indicates that the user equipment has the duplex capability in an uplink frequency band and a downlink frequency band of the working frequency band in a case that the first field corresponds to a first value; and the first field indicates that the user equipment does not have the duplex capability in the uplink frequency band and the downlink frequency band of the working frequency band in a case that the first field corresponds to a second value.

In an example, 1 bit is occupied by the first field in the reported information.

In a case that a value of the first field is 1, it represents that the user equipment has the duplex capability in both the uplink frequency band and the downlink frequency band of the working frequency band.

In a case that the value of the first field is 0, it represents that the user equipment does not have the duplex capability in either the uplink frequency band or the downlink frequency band of the working frequency band.

Embodiments of the present disclosure provide the method for transmitting the capability of the user equipment. This method is performed by the network device. This method includes the following steps.

The first indication information is sent to the user equipment in response to the working frequency band of the user equipment being the frequency division multiplexing frequency band, where the first indication information is configured to indicate the user equipment to report the information of the duplex capability corresponding to the working frequency band.

The reported information is received from the user equipment, and the reported information is configured to indicate the information of the duplex capability corresponding to the working frequency band for the user equipment.

The reported information includes an uplink field and a downlink field, where the uplink field indicates that the user equipment has the duplex capability in the uplink frequency band of the working frequency band in a case that the uplink field corresponds to a third value; the uplink field indicates that the user equipment does not have the duplex capability in the uplink frequency band of the working frequency band in a case that the uplink field corresponds to a fourth value; the downlink field indicates that the user equipment has the duplex capability in the downlink frequency band of the working frequency band in a case that the downlink field corresponds to a fifth value; and the downlink field indicates that the user equipment does not have the duplex capability in the downlink frequency band of the working frequency band in a case that the downlink field corresponds to a sixth value.

In an example, 1 bit is occupied by the uplink field in the reported information, and 1 bit is occupied by the downlink field in the reported information.

In a case that a value of the uplink field is 1, it represents that the user equipment has the duplex capability in the uplink frequency band of the working frequency band.

In a case that the value of the uplink field is 0, it represents that the user equipment does not have the duplex capability in the uplink frequency band of the working frequency band.

In a case that a value of the downlink field is 1, it represents that the user equipment has the duplex capability in the downlink frequency band of the working frequency band.

In a case that the value of the downlink field is 0, it represents that the user equipment does not have the duplex capability in the downlink frequency band of the working frequency band.

That is, in a case that the value of the uplink field is 1 and the value of the downlink field is 1, it represents that the user equipment has the duplex capability in both the uplink frequency band and the downlink frequency band of the working frequency band; in a case that the value of the uplink field is 1 and the value of the downlink field is 0, it represents that the user equipment has the duplex capability in the uplink frequency band of the working frequency band and does not have the duplex capability in the downlink frequency band of the working frequency band; in a case that the value of the uplink field is 0 and the value of the downlink field is 1, it represents that the user equipment does not have the duplex capability in the uplink frequency band of the working frequency band and has the duplex capability in the downlink frequency band of the working frequency band; and in a case that the value of the uplink field is 0 and the value of the downlink field is 0, it represents that the user equipment does not have the duplex capability in either the uplink frequency band or the downlink frequency band of the working frequency band.

It may be understood that different combinations of values for the uplink field and the downlink field in the above examples exist independently and that these combinations are exemplarily provided in the one example, which does not represent that all combinations in the example must exist simultaneously as shown in the example. One value in each combination is independent of other values shown in the example. Therefore, it should be understood by those skilled in the art that the corresponding values in each combination in the example may be separated embodiments.

Embodiments of the present disclosure provide the method for transmitting the capability of the user equipment. This method is performed by the network device. This method includes the following steps.

The first indication information is sent to the user equipment in response to the working frequency band of the user equipment being the frequency division multiplexing frequency band, where the first indication information is configured to indicate the user equipment to report the information of the duplex capability corresponding to the working frequency band.

The reported information is received from the user equipment, and the reported information is configured to indicate the information of the duplex capability corresponding to the working frequency band from the user equipment.

The reported information includes a second field, where the second field indicates that the user equipment does not have the duplex capability in the uplink frequency band and the downlink frequency band of the working frequency band in a case that the second field corresponds to a seventh value; the second field indicates that the user equipment has the duplex capability in the uplink frequency band of the working frequency band and does not have the duplex capability in the downlink frequency band of the working frequency band in a case that the second field corresponds to an eighth value; the second field indicates that the user equipment does not have the duplex capability in the uplink frequency band of the working frequency band and has the duplex capability in the downlink frequency band of the working frequency band in a case that the second field corresponds to a ninth value; and the second field indicates that the user equipment has the duplex capability in the uplink frequency band and the downlink frequency band of the working frequency band in a case that the second field corresponds to a tenth value.

In an example, the number of bits occupied by the second field is 2.

In a case that a value of the second field is 11, it represents that the user equipment has the duplex capability in the uplink frequency band and the downlink frequency band of the working frequency band.

In a case that the value of the second field is 10, it represents that the user equipment has the duplex capability in the uplink frequency band of the working frequency band and does not have the duplex capability in the downlink frequency band of the working frequency band.

In a case that the value of the second field is 01, it represents that the user equipment does not have the duplex capability in the uplink frequency band of the working frequency band and has the duplex capability in the downlink frequency band of the working frequency band.

In a case that the value of the second field is 00, it represents that the user equipment does not have the duplex capability in the uplink frequency band and the downlink frequency band of the working frequency band.

In another example, the number of bits occupied by the second field is 2.

In a case that the value of the second field is 11, it represents that the user equipment has the duplex capability in both the uplink frequency band and the downlink frequency band of the working frequency band.

In a case that the value of the second field is 01, it represents that the user equipment has the duplex capability in the uplink frequency band of the working frequency band and does not have the duplex capability in the downlink frequency band of the working frequency band.

In a case that the value of the second field is 10, it represents that the user equipment does not have the duplex capability in the uplink frequency band of the working frequency band and has the duplex capability in the downlink frequency band of the working frequency band.

In a case that the value of the second field is 00, it represents that the user equipment does not have the duplex capability in the uplink frequency band and the downlink frequency band of the working frequency band.

Embodiments of the present disclosure provide the method for transmitting the capability of the user equipment. This method is performed by the network device. This method includes the following step. A transmission position of an uplink carrier is set in the working frequency band in a case that it is learned that the user equipment has the duplex capability in the uplink frequency band of the working frequency band, in response to using carrier aggregation or establishing a double link with the user equipment.

In an example, as shown in FIG. 7, the network device uses the carrier aggregation or establishes the double link with the user equipment, and when network device learns that the user equipment has the duplex capability in the uplink frequency band of the working frequency band, it sets the transmission position of the uplink carrier in the working frequency band (corresponding to a dotted box).

Embodiments of the present disclosure provide the method for transmitting the capability of the user equipment. This method is performed by the network device. This method includes the following step. A transmission position of a downlink carrier is set in the working frequency band in a case that it is learned that the user equipment has the duplex capability in the downlink frequency band of the working frequency band, in response to using the carrier aggregation or establishing the double link with the user equipment.

Figure 8:
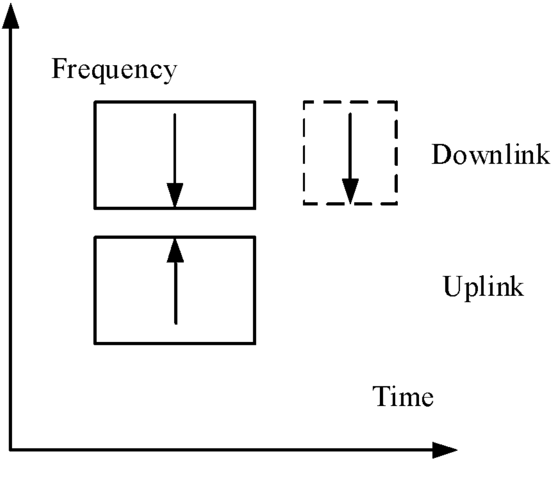
FIG. 8 is a schematic diagram illustrating a method for setting a downlink carrier according to an embodiment.

In an example, as shown in FIG. 8, the network device uses the carrier aggregation or establishes the double link with the user equipment, and when the network device learns that the user equipment has the duplex capability in the downlink frequency band of the working frequency band, it sets the transmission position of the downlink carrier in the working frequency band (corresponding to a dotted box).

Embodiments of the present disclosure provide the method for transmitting the capability of the user equipment. This method is performed by the network device. This method includes: sending resource scheduling information to the user equipment, the resource scheduling information being configured to indicate an uplink resource and a downlink resource that are consistent with the information of the duplex capability.

In some possible embodiments, allocation of uplink and downlink resources may be performed by statically configuring an uplink and downlink frame structure through radio resource control (RRC) signaling, or may be performed by dynamically adjusting and indicating a ratio of uplink and downlink time slots or a ratio of uplink and downlink orthogonal frequency division multiplexing (OFDM) symbols via medium access control (MAC).

Embodiments of the present disclosure provide a method for transmitting capability of a user equipment. This method is performed by the user equipment. This method includes the following step. The first indication information is received from a network device, where the first indication information is configured to indicate the user equipment to report information of a duplex capability corresponding to a working frequency band.

In embodiments of the present disclosure, the user equipment receives the first indication information from the network device to trigger the transmission of the reported information to the network device from the user equipment, to allow the network device to learn the information of the duplex capability corresponding to the working frequency band for the user equipment. In this way, the network device may flexibly allocate the uplink resource and the downlink resource matched with the duplex capability to the user equipment based on whether the user equipment has the duplex capability and a specific type of the duplex capability the user equipment has, thus improving the utilization efficiency of the frequency spectrum.

Embodiments of the present disclosure provide the method for transmitting the capability of the user equipment. This method is performed by the user equipment. This method includes: sending reported information to the network device, the reported information being configured to indicate the information of the duplex capability corresponding to the working frequency band for the user equipment.

In embodiments of the present disclosure, the user equipment sends the reported information to the network device, so that the network device learns the information of the duplex capability corresponding to the working frequency band for the user equipment. In this way, the network device may flexibly allocate the uplink resource and the downlink resource matched with the duplex capability to the user equipment based on whether the user equipment has the duplex capability and a specific type of the duplex capability the user equipment has, thus improving the utilization efficiency of the frequency spectrum.

Embodiments of the present disclosure provide the method for transmitting the capability of the user equipment. This method is performed by the user equipment. This method includes the following steps.

The first indication information is received from the network device, where the first indication information is configured to indicate the user equipment to report the information of the duplex capability corresponding to the working frequency band. The reported information is sent to the network device, where the reported information is configured to indicate the information of the duplex capability corresponding to the working frequency band for the user equipment.

The reported information includes the first field, where the first field indicates that the user equipment has the duplex capability in an uplink frequency band and a downlink frequency band of the working frequency band in a case that the first field corresponds to a first value; and the first field indicates that the user equipment does not have the duplex capability in the uplink frequency band and the downlink frequency band of the working frequency band in a case that the first field corresponds to a second value.

Embodiments of the present disclosure provide the method for transmitting the capability of the user equipment. This method is performed by the user equipment. This method includes the following steps.

The first indication information is received from the network device, where the first indication information is configured to indicate the user equipment to report the information of the duplex capability corresponding to the working frequency band. The reported information is sent to the network device, where the reported information is configured to indicate the information of the duplex capability corresponding to the working frequency band from the user equipment.

The reported information includes an uplink field and a downlink field, where the uplink field indicates that the user equipment has the duplex capability in the uplink frequency band of the working frequency band in a case that the uplink field corresponds to a third value; the uplink field indicates that the user equipment does not have the duplex capability in the uplink frequency band of the working frequency band in a case that the uplink field corresponds to a fourth value; the downlink field indicates that the user equipment has the duplex capability in the downlink frequency band of the working frequency band in a case that the downlink field corresponds to a fifth value; and the downlink field indicates that the user equipment does not have the duplex capability in the downlink frequency band of the working frequency band in a case that the downlink field corresponds to a sixth value.

Embodiments of the present disclosure provide the method for transmitting the capability of the user equipment. This method is performed by the user equipment. This method includes the following steps.

The first indication information is received from the network device, where the first indication information is configured to indicate the user equipment to report the information of the duplex capability corresponding to the working frequency band. The reported information is sent to the network device, where the reported information is configured to indicate the information of the duplex capability corresponding to the working frequency band for the user equipment.

The reported information includes a second field, where the second field indicates that the user equipment does not have the duplex capability in the uplink frequency band and the downlink frequency band of the working frequency band in a case that the second field corresponds to a seventh value; the second field indicates that the user equipment has the duplex capability in the uplink frequency band of the working frequency band and does not have the duplex capability in the downlink frequency band of the working frequency band in a case that the second field corresponds to an eighth value; the second field indicates that the user equipment does not have the duplex capability in the uplink frequency band of the working frequency band and has the duplex capability in the downlink frequency band of the working frequency band in a case that the second field corresponds to a ninth value; and the second field indicates that the user equipment has the duplex capability in the uplink frequency band and the downlink frequency band of the working frequency band in a case that the second field corresponds to a tenth value.

Embodiments of the present disclosure provide the method for transmitting the capability of the user equipment. This method is performed by the user equipment. This method includes: receiving resource scheduling information from the network device, where the resource scheduling information is configured to indicate an uplink resource and a downlink resource that are consistent with the information of the duplex capability.

Based on the same inventive concept as the above method embodiments, embodiments of the present disclosure further provide a communication device/apparatus that may have the functions of the network device 102 in the above-described method embodiments and may be used to perform the steps performed by the network device 102 provided by the above-described method embodiments. The functions may be implemented by hardware, or may be implemented by software or hardware executing corresponding software. The hardware or software includes one or more modules corresponding to the functions described above.

Figure 9:
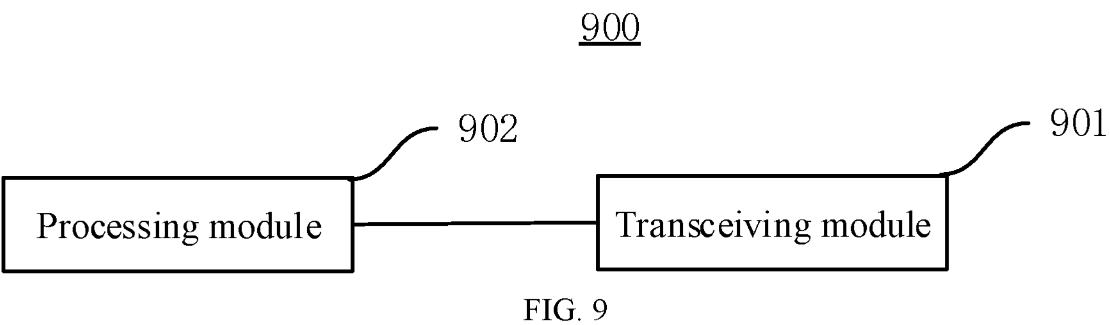
FIG. 9 is a structural diagram illustrating an apparatus for transmitting capability of a user equipment according to an embodiment.

In a possible implementation, a communication apparatus 900 is provided as shown in FIG. 9 and may be served as the network device involved in the method embodiments described above and perform the steps performed by the network device in the method embodiments described above. As shown in FIG. 9, the communication apparatus 900 may include a transceiving module 901 and a processing module 902 coupled to each other. The transceiving module 901 is configured to support communication of the communication apparatus 900, and the transceiving module 901 has a wireless communication function, for example, the transceiving module 901 may perform wireless communication with other communication devices through a wireless radio. The processing module 902 is configured to support the communication apparatus 900 to perform processing operations in the above-described method embodiments, including but not limited to: generating information, messages sent by the transceiving module 901, and/or demodulating and decoding signals received by the transceiving module 901.

In the case of performing the steps implemented by the network device 102, the transceiving module 901 is configured to send the first indication information to the user equipment in response to the working frequency band of the user equipment being the frequency division multiplexing frequency band, where the first indication information is configured to indicate the user equipment to report the information of the duplex capability corresponding to the working frequency band.

In a possible implementation, the transceiving module 901 is further configured to receive the reported information from the user equipment, where the reported information is configured to indicate the information of the duplex capability corresponding to the working frequency band from the user equipment.

In a possible implementation, the reported information includes the first field, where the first field indicates that the user equipment has the duplex capability in the uplink frequency band and the downlink frequency band of the working frequency band in a case that the first field corresponds to the first value; and the first field indicates that the user equipment does not have the duplex capability in the uplink frequency band and the downlink frequency band of the working frequency band in a case that the first field corresponds to the second value.

In a possible implementation, the reported information includes the uplink field and the downlink field, where the uplink field indicates that the user equipment has the duplex capability in the uplink frequency band of the working frequency band in a case that the uplink field corresponds to the third value; the uplink field indicates that the user equipment does not have the duplex capability in the uplink frequency band of the working frequency band in a case that the uplink field corresponds to the fourth value; the downlink field indicates that the user equipment has the duplex capability in the downlink frequency band of the working frequency band in a case that the downlink field corresponds to the fifth value; and the downlink field indicates that the user equipment does not have the duplex capability in the downlink frequency band of the working frequency band in a case that the downlink field corresponds to the sixth value.

In a possible implementation, the reported information includes the second field, where the second field indicates that the user equipment does not have the duplex capability in the uplink frequency band and the downlink frequency band of the working frequency band in a case that the second field corresponds to the seventh value; the second field indicates that the user equipment has the duplex capability in the uplink frequency band of the working frequency band and does not have the duplex capability in the downlink frequency band of the working frequency band in a case that the second field corresponds to the eighth value; the second field indicates that the user equipment does not have the duplex capability in the uplink frequency band of the working frequency band and has the duplex capability in the downlink frequency band of the working frequency band in a case that the second field corresponds to the ninth value; and the second field indicates that the user equipment has the duplex capability in both the uplink frequency band and the downlink frequency band of the working frequency band in a case that the second field corresponds to the tenth value.

In a possible implementation, the processing module 902 is configured to set the transmission position of the uplink carrier in the working frequency band in a case that it is learned that the user equipment has the duplex capability in the uplink frequency band of the working frequency band, in response to using the carrier aggregation or establishing the double link with the user equipment; and the processing module 902 is configured to set the transmission position of the downlink carrier in the working frequency band in a case that it is learned that the user equipment has the duplex capability in the downlink frequency band of the working frequency band, in response to using the carrier aggregation or establishing the double link with the user equipment.

In a possible implementation, the transceiving module 901 is configured to send resource scheduling information to the user equipment, where the resource scheduling information is configured to indicate the uplink resource and the downlink resource that are consistent with the information of the duplex capability.

Figure 10:
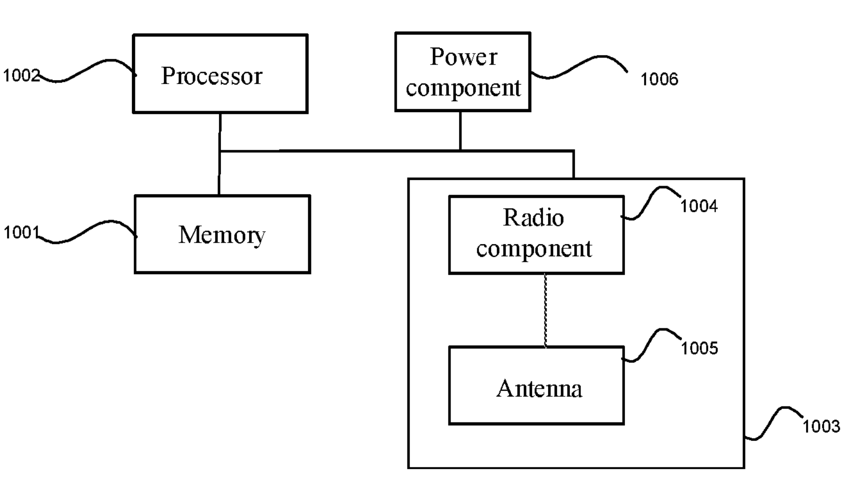
FIG. 10 is a structural diagram illustrating a device for transmitting capability of a user equipment according to an embodiment.

In a case that a communication device is provided as the network device 102, a structure thereof may be as shown in FIG. 10. The structure of the communication device is illustrated with a base station as an example. As shown in FIG. 10, a device 1000 includes a memory 1001, a processor 1002, a transceiving component 1003, and a power component 1006. The memory 1001 is coupled to the processor 1002 and is configured to store programs and data necessary to implement various functions of the communication device 1000. The processor 1002 is configured to support the communication device 1000 to realize the corresponding functions in the method described above, which may be implemented by calling a program stored in the memory 1001. The transceiving component 1003 may be a wireless transceiver and is configured to support the communication device 1000 to receive signaling and/or data and transmit signaling and/or data over a wireless radio. The transceiving component 1003, which may also be referred to as a transceiving unit or a communication unit, may include a radio component 1004, which may be a remote radio unit (RRU), specifically for transmission of radio frequency signal and conversion of a radio frequency signal to a baseband signal, and one or more antennas 1005, specifically for transmission and reception of the radio frequency signal.

In a case that the communication device 1000 needs to transmit the data, the processor 1002 may perform baseband processing on the data to be transmitted and output the baseband signal to the radio unit, and the radio unit performs radio processing on the baseband signal and then transmits the radio frequency signal in a form of an electromagnetic wave through an antenna. When data is transmitted to the communication device 1000, the radio unit receives the radio frequency signal through the antenna, converts the radio frequency signal into the baseband signal, and outputs the baseband signal to the processor 1002, and the processor 1002 converts the baseband signal into data and processes the data.

Based on the same inventive concept as the above method embodiments, embodiments of the present disclosure further provide a communication device/apparatus that may have the functions of the user equipment 101 in the above-described method embodiments and may be used to perform the steps performed by the user equipment 101 provided by the above-described method embodiments. The functions may be implemented by hardware, or may be implemented by software or hardware executing corresponding software. The hardware or software includes one or more modules corresponding to the functions described above.

Figure 11:
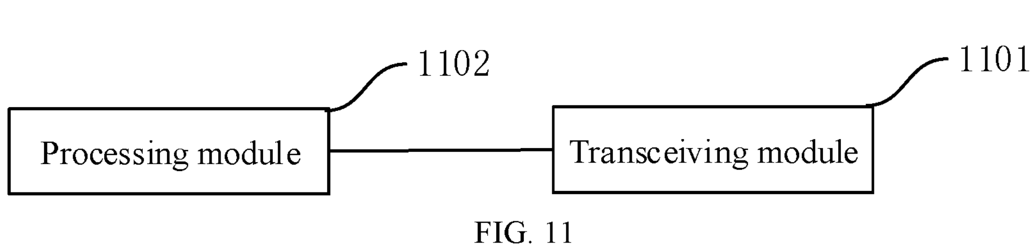
FIG. 11 is a structural diagram illustrating an apparatus for transmitting capability of a user equipment according to an embodiment.

In a possible implementation, a communication apparatus 1100 is provided as shown in FIG. 11, and may be served as the user equipment involved in the method embodiments described above and perform the steps performed by the user equipment in the method embodiments described above. As shown in FIG. 11, the communication apparatus 1100 may include a transceiving module 1101 and a processing module 1102 coupled to each other. The transceiving module 1101 is configured to support communication of the communication apparatus 1100, and the transceiving module 1101 has the wireless communication function, for example, the transceiving module 1101 may perform the wireless communication with other communication devices through the wireless radio. The processing module 1102 may be configured to support the communication apparatus 1100 to perform processing operations in the above-described method embodiments, including, but not limited to: generating information and messages sent by the transceiving module 1101, and/or demodulating and decoding signals received by the transceiving module 1101.

In the case of performing the steps implemented by the user equipment 102, the transceiving module 1101 is configured to receive the first indication information from the network device, where the first indication information is configured to indicate the user equipment to report the information of the duplex capability corresponding to the working frequency band; and the transceiving module 1101 is further configured to send the reported information to the network device, where the reported information is configured to indicate the information of the duplex capability corresponding to the working frequency band for the user equipment.

In a possible implementation, the reported information includes the first field, where the first field indicates that the user equipment has the duplex capability in the uplink frequency band and the downlink frequency band of the working frequency band in a case that the first field corresponds to the first value; and the first field indicates that the user equipment does not have the duplex capability in the uplink frequency band and the downlink frequency band of the working frequency band in a case that the first field corresponds to the second value.

In a possible implementation, the reported information includes the uplink field and the downlink field, where the uplink field indicates that the user equipment has the duplex capability in the uplink frequency band of the working frequency band in a case that the uplink field corresponds to the third value; the uplink field indicates that the user equipment does not have the duplex capability in the uplink frequency band of the working frequency band in a case that the uplink field corresponds to the fourth value; the downlink field indicates that the user equipment has the duplex capability in the downlink frequency band of the working frequency band in a case that the downlink field corresponds to the fifth value; and the downlink field indicates that the user equipment does not have the duplex capability in the downlink frequency band of the working frequency band in a case that the downlink field corresponds to the sixth value.

In a possible implementation, the reported information includes the second field, where the second field indicates that the user equipment does not have the duplex capability in both the uplink frequency band and the downlink frequency band of the working frequency band in a case that the second field corresponds to the seventh value; the second field indicates that the user equipment has the duplex capability in the uplink frequency band of the working frequency band and does not have the duplex capability in the downlink frequency band of the working frequency band in a case that the second field corresponds to the eighth value; the second field indicates that the user equipment does not have the duplex capability in the uplink frequency band of the working frequency band and has the duplex capability in the downlink frequency band of the working frequency band in a case that the second field corresponds to the ninth value; and the second field indicates that the user equipment has the duplex capability in both the uplink frequency band and the downlink frequency band of the working frequency band in a case that the second field corresponds to the tenth value.

In a possible implementation, the transceiving module 1101 is configured to receive the resource scheduling information from the network device, where the resource scheduling information is configured to indicate the uplink resource and the downlink resource that are consistent with the information of the duplex capability.

Figure 12:
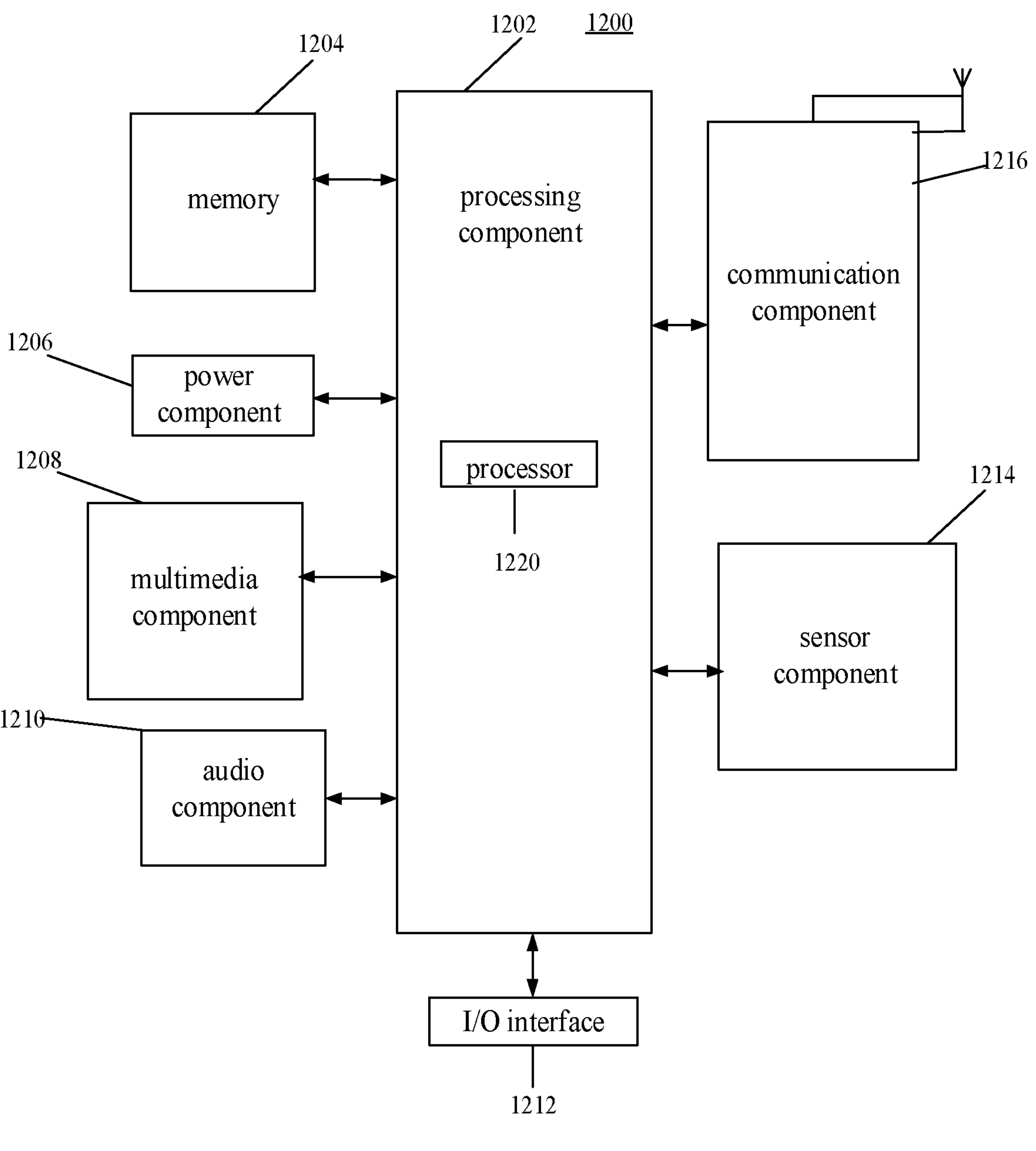
FIG. 12 is a structural diagram illustrating a device for transmitting capability of a user equipment according to an embodiment.

In a case that a communication device is provided as the user equipment 101, the structure thereof may also be as shown in FIG. 12. The device 1200 can be a mobile phone, a computer, a digital broadcast terminal, a messaging device, a game console, a tablet device, a medical device, a fitness device, a personal digital assistant, or the like.

Referring to FIG. 12, the device 1200 may include one or more of the following components: a processing component 1202, a memory 1204, a power component 1206, a multimedia component 1208, an audio component 1210, an input/output (I/O) interface 1212, a sensor component 1214, and a communication component 216.

The processing component 1202 typically controls overall operations of the device 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the device 1200. Examples of such data include instructions for any applications or methods operated on the device 1200, contact data, phonebook data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the device 1200. The power component 1206 may include a power management system, one or more power sources, and any other components associated with generation, management, and distribution of power in the device 1200.

The multimedia component 1208 includes a screen providing an output interface and located between the device 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and/or the rear camera may receive an external multimedia datum while the device 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone (MIC) configured to receive an external audio signal when the device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the device 1200. For instance, the sensor component 1214 may detect an open/closed status of the device 1200, relative positioning of components, e.g., the display and the keypad, of the device 1200, a change in position of the device 1200 or a component of the device 1200, a presence or absence of user contact with the device 1200, an orientation or an acceleration/deceleration of the device 1200, and a change in temperature of the device 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the device 1200 and other devices. The device 1200 can access a wireless network based on a communication standard, such as WiFi, 2G, or 3G, or a combination thereof. In one embodiment, the communication component 1216 receives a broadcast signal or broadcast associated information from an external broadcast management system via a broadcast channel. In one embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In embodiments, the device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In embodiments, there is also provided a non-transitory computer-readable storage medium including instructions, such as included in the memory 1204, executable by the processor 1220 in the device 1200, for performing the above-described methods. For example, the non-transitory computer-readable storage medium may be a ROM, a RAM, a CD-ROM, a magnetic tape, a floppy disc, an optical data storage device, and the like.

INDUSTRIAL APPLICABILITY

The network device sends the first indication information to the user equipment to allow the user equipment to report the information of the duplex capability thereof in the working frequency band, so that the network device can flexibly allocate the uplink resource and the downlink resource matched with the duplex capability of the user equipment based on whether the user equipment has the duplex capability and a specific type of the duplex capability the user equipment has, thus improving the utilization efficiency of the frequency spectrum.

What is claimed is:

1. A method for transmitting capability of a user equipment, performed by a network device, comprising:

sending first indication information to the user equipment in response to a working frequency band of the user equipment being a frequency division multiplexing frequency band, wherein the first indication information instructs the user equipment to report information of a duplex capability corresponding to the working frequency band;

wherein the method further comprises:

receiving reported information from the user equipment, wherein the reported information indicates the information of the duplex capability corresponding to the working frequency band for the user equipment;

wherein the reported information comprises an uplink field and a downlink field, wherein the uplink field indicates that the user equipment has the duplex capability in an uplink frequency band of the working frequency band in response to determining that the uplink field corresponds to a third value;

wherein the uplink field indicates that the user equipment does not have the duplex capability in the uplink frequency band of the working frequency band in response to determining that the uplink field corresponds to a fourth value;

wherein the downlink field indicates that the user equipment has the duplex capability in a downlink frequency band of the working frequency band in response to determining that the downlink field corresponds to a fifth value; and wherein the downlink field indicates that the user equipment does not have the duplex capability in the downlink frequency band of the working frequency band in response to determining that the downlink field corresponds to a sixth value.

2. The method according to claim 1, wherein the reported information comprises a first field, wherein the first field indicates that the user equipment has the duplex capability in an uplink frequency band and a downlink frequency band of the working frequency band in response to determining that the first field corresponds to a first value; and wherein the first field indicates that the user equipment does not have the duplex capability in the uplink frequency band and the downlink frequency band of the working frequency band in response to determining that the first field corresponds to a second value.

3. The method according to claim 1, wherein the reported information comprises a second field, wherein the second field indicates that the user equipment does not have the duplex capability in an uplink frequency band and a downlink frequency band of the working frequency band in response to determining that the second field corresponds to a seventh value;

wherein the second field indicates that the user equipment has the duplex capability in the uplink frequency band of the working frequency band and does not have the duplex capability in the downlink frequency band of the working frequency band in response to determining that the second field corresponds to an eighth value;

wherein the second field indicates that the user equipment does not have the duplex capability in the uplink frequency band of the working frequency band and has the duplex capability in the downlink frequency band of the working frequency band in response to determining that the second field corresponds to a ninth value; and wherein the second field indicates that the user equipment has the duplex capability in the uplink frequency band and the downlink frequency band of the working frequency band in response to determining that the second field corresponds to a tenth value.

4. The method according to claim 1, wherein in response to using carrier aggregation or establishing double links with the user equipment and in response to determining that the user equipment has the duplex capability in an uplink frequency band of the working frequency band, a transmission position of an uplink carrier is set in the working frequency band; and in response to using the carrier aggregation or establishing the double links with the user equipment and in response to determining that the user equipment has the duplex capability in a downlink frequency band of the working frequency band, a transmission position of a downlink carrier is set in the working frequency band.

5. The method according to claim 1, further comprising:

sending resource scheduling information to the user equipment, the resource scheduling information being configured to indicate an uplink resource and a downlink resource that are consistent with the information of the duplex capability.

6. A non-transitory computer readable storage medium having stored therein instructions that, when invoked and executed by a computer, cause the computer to perform the method according to claim 1.

7. A method for transmitting capability of a user equipment, performed by the user equipment, comprising:

receiving first indication information from a network device, wherein the first indication information instructs the user equipment to report information of a duplex capability corresponding to a working frequency band;

wherein the method further comprises:

sending reported information to the network device, wherein the reported information indicates the information of the duplex capability corresponding to the working frequency band for the user equipment;

wherein the reported information comprises an uplink field and a downlink field, wherein the uplink field indicates that the user equipment has the duplex capability in an uplink frequency band of the working frequency band in response to determining that the uplink field corresponds to a third value;

wherein the uplink field indicates that the user equipment does not have the duplex capability in the uplink frequency band of the working frequency band in response to determining that the uplink field corresponds to a fourth value;

wherein the downlink field indicates that the user equipment has the duplex capability in a downlink frequency band of the working frequency band in response to determining that the downlink field corresponds to a fifth value; and wherein the downlink field indicates that the user equipment does not have the duplex capability in the downlink frequency band of the working frequency band in response to determining that the downlink field corresponds to a sixth value.

8. The method according to claim 7, wherein the reported information comprises a first field, wherein the first field indicates that the user equipment has the duplex capability in an uplink frequency band and a downlink frequency band of the working frequency band in response to determining that the first field corresponds to a first value; and wherein the first field indicates that the user equipment does not have the duplex capability in the uplink frequency band and the downlink frequency band of the working frequency band in response to determining that the first field corresponds to a second value.

9. The method according to claim 7, wherein the reported information comprises a second field, wherein the second field indicates that the user equipment does not have the duplex capability in an uplink frequency band and a downlink frequency band of the working frequency band in response to determining that the second field corresponds to a seventh value;

wherein the second field indicates that the user equipment has the duplex capability in the uplink frequency band of the working frequency band and does not have the duplex capability in the downlink frequency band of the working frequency band in response to determining that the second field corresponds to an eighth value;

wherein the second field indicates that the user equipment does not have the duplex capability in the uplink frequency band of the working frequency band and has the duplex capability in the downlink frequency band of the working frequency band in response to determining that the second field corresponds to a ninth value; and wherein the second field indicates that the user equipment has the duplex capability in the uplink frequency band and the downlink frequency band of the working frequency band in response to determining that the second field corresponds to a tenth value.

10. The method according to claim 7, further comprising:

receiving resource scheduling information from the network device, wherein the resource scheduling information indicates an uplink resource and a downlink resource that are consistent with the information of the duplex capability.

11. A user equipment, comprising a processor and a memory;

wherein the memory is configured to store a computer program; and the processor is configured to execute the computer program to implement the method according to claim 7.

12. A non-transitory computer readable storage medium having stored therein instructions that, when invoked and executed by a computer, cause the computer to perform the method according to claim 7.

13. A network device, comprising a processor and a memory;

wherein the memory is configured to store a computer program; and the processor is configured to execute the computer program to implement a method for transmitting capability of a user equipment, the method comprising:

sending first indication information to the user equipment in response to a working frequency band of the user equipment being a frequency division multiplexing frequency band, wherein the first indication information indicates the user equipment to report information of a duplex capability corresponding to the working frequency band;

wherein the method further comprises:

receiving reported information from the user equipment, wherein the reported information indicates the information of the duplex capability corresponding to the working frequency band for the user equipment;

wherein the reported information comprises an uplink field and a downlink field, wherein the uplink field indicates that the user equipment has the duplex capability in an uplink frequency band of the working frequency band in response to determining that the uplink field corresponds to a third value;

wherein the uplink field indicates that the user equipment does not have the duplex capability in the uplink frequency band of the working frequency band in response to determining that the uplink field corresponds to a fourth value;

wherein the downlink field indicates that the user equipment has the duplex capability in a downlink frequency band of the working frequency band in response to determining that the downlink field corresponds to a fifth value; and wherein the downlink field indicates that the user equipment does not have the duplex capability in the downlink frequency band of the working frequency band in response to determining that the downlink field corresponds to a sixth value.

14. The network device according to claim 13, wherein the reported information comprises a first field, wherein the first field indicates that the user equipment has the duplex capability in an uplink frequency band and a downlink frequency band of the working frequency band in response to determining that the first field corresponds to a first value; and wherein the first field indicates that the user equipment does not have the duplex capability in the uplink frequency band and the downlink frequency band of the working frequency band in response to determining that the first field corresponds to a second value.

* * * * *